INVENTOR.
LEONARD H. Roos

Patented Oct. 4, 1949

2,483,711

UNITED STATES PATENT OFFICE 2,483,711

CAMERA HOLDER

Leonard H. Roos, Burbank, Calif., assignor to Micro-Engineering Corporation, Los Angeles, Calif., a corporation of California Application October 14, 1946, Serial No. 703,197

2 Claims. (Cl. 95—86)

This invention relates to and has for an object the provision of a holder for cameras of novel form which is arranged to support a camera adjustably on the shoulder after the fashion of a rifle whereby focusing of the camera may be effected in a manner similar to the sighting of a gun relative to a target.

An object is to provide a rigid support having a shoulder rest or stock from which a bar is extended forwardly and adapted to both slidably and rotatably support a camera, said bar or bed having a hand grip depending therefrom and if desirable a wrist band, so that when properly held the camera will be steadied.

Another object is to provide a guarded trigger which is operative for actuating the camera as and when desired.

I prefer to form my novel camera holder as shown in the accompanying drawing, in which.

Figure 1:
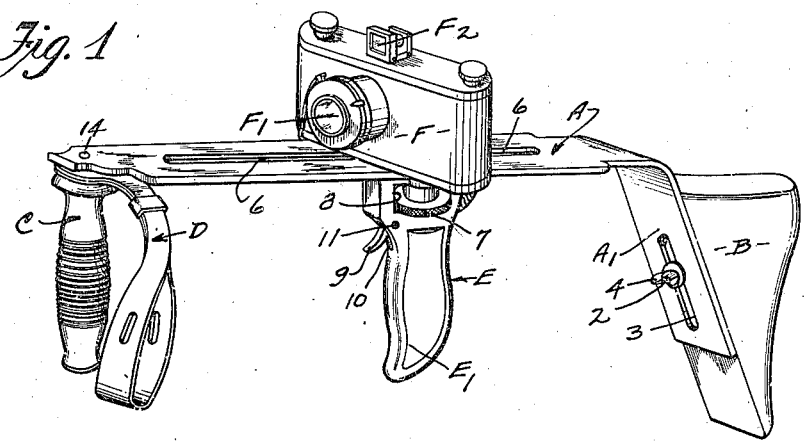
Fig. 1 is a perspective view.
Figure 2:
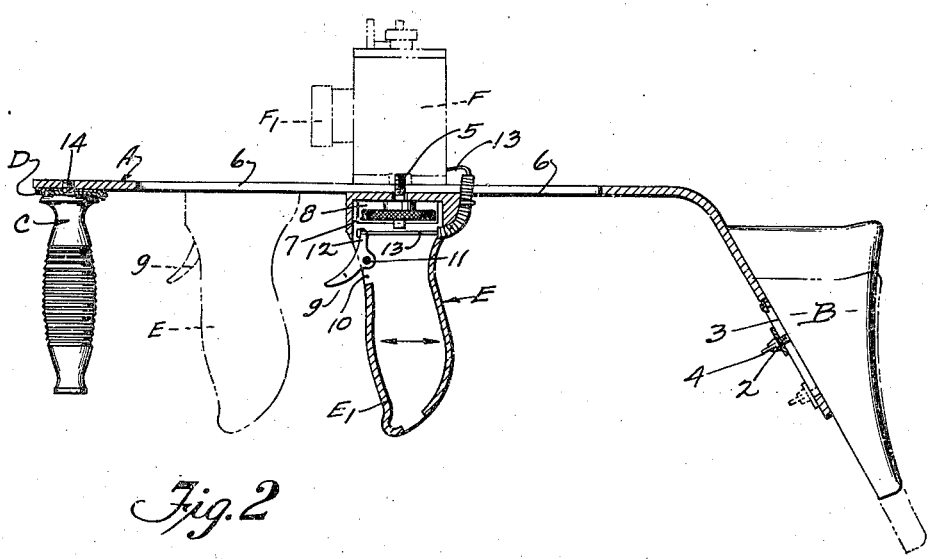
Fig. 2 is a longitudinal section, with a camera supported thereon.

The holder as shown includes a metal bar A of flat cross section, with an adjustable shoulder rest B attached to an angularly bent rest support $A_1$, a hand grip C and a wrist strap D at the front end of the bar, and an adjustable camera mounting E which is adjustable on bar A for attachment to and movement with a camera F.

Rest B is adjustable inclinably on portion $A_1$ of bed A as by means of a screw 2 extending through a slot 3 and may be held in adjusted position by a nut 4 so as to accommodate the rest to a convenient and proper position on the shoulder of a photographer.

Camera F is adjustable longitudinally on bed A together with mounting E as by means of a screw 5 extended through a long slot 6 in the bed and having a nut 7 whose knurled edge protrudes from an opening 8 in the mounting. By loosening the nut 7 the camera may be rotatably adjusted on the bed and mounting.

A suitable trigger 9 projects through an opening 10 of the mounting and is pivoted on said housing at 11. An upper arm 12 of the trigger is attached to a cord or wire 13 which is connected with the shutter mechanism of the camera. Grip C and wrist strap D may be commonly attached to the front end of bed A on a pin or screw 14.

In operation, the camera and mounting are loosely mounted on the bed A with screw 5 screwed into the bottom of the camera housing. Shoulder rest B is adjusted upwardly or downwardly on portion $A_1$ to a proper position while the grip C is held in one hand of a photographer, then nut 4 is tightened for holding rest B in its adjusted position. While the bed is held in horizontal or inclined position by a hold on grip C the camera is adjusted longitudinally to a position bringing the usual view finder fitted to the camera to a convenient distance from the eye of the user. Nut 7 is tightened for holding the camera in adjusted position, and by pressing inwardly on trigger 9 the camera is actuated for taking a picture.

It is important to note that once the proper adjustments of the holder and camera are made the camera will remain in focus when the holder is properly held against the shoulder of an operator for making repeated exposures of a scene or subject. The rest B is best positioned when the eyes are alined with the finder sight $F_2$ of the camera.

Strap D, when the hand of an operator is extended therethrough for gripping member C, aids an operator in steadying the apparatus and also serves as a means for carrying the holder from one place to another.

It is to be noted that mounting E has a grip $E_1$ for one hand while grip C is held in the other hand in such a manner that a finger of the hand on said mounting is employed for actuating the camera. The raising and lowering of shoulder rest B not only serves to accommodate the rest to the shoulder of an operator but also alines the eyes of the operator with the sighting finder of the camera.

I claim:

1. A camera holder comprising: a flat bar; a shoulder rest provided at the rear end of said flat bar; a hand grip extending downwardly from the front end of said flat bar and rigidly secured to the bar; a second hand grip extending downwardly from said bar and longitudinally adjustable thereon, the last mentioned hand grip being connected with the camera and carrying means for locking the camera to the aforesaid bar and for operating the camera shutter.

2. A camera holder as set forth in claim 1 and in which the adjustable hand grip is formed by a housing enclosing the locking means for the camera and also enclosing a trigger mechanism operatively connected with the shutter mechanism of the camera, the wall of the housing being provided with openings through which the trigger and a member adapted to actuate the locking means for the camera projects.

LEONARD H. ROOS.

REFERENCES CITED

The following references are of record in the file of this patent:

UNITED STATES PATENTS

| Number | Name | Date |
|---|---|---|
| 1,088,362 | Perkins | Feb. 24, 1914 |
| 2,130,262 | Burlin | Sept. 13, 1938 |
| 2,140,050 | Hart | Dec. 13, 1938 |
| 2,275,644 | Olmstead | Mar. 10, 1942 |
| 2,370,611 | DuMais | Feb. 27, 1945 |